United States Patent
Chen et al.

(10) Patent No.: US 8,188,857 B2
(45) Date of Patent: May 29, 2012

(54) AUTHENTICATION SYSTEM AND METHOD THEREOF FOR WIRELESS NETWORKS

(75) Inventors: Yu-Tso Chen, Hsinchu County (TW); Teng-Jui Shih, Hsinchu County (TW); Shin-Yan Chiou, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 618 days.

(21) Appl. No.: 11/877,682

(22) Filed: Oct. 24, 2007

(65) Prior Publication Data

US 2009/0045943 A1 Feb. 19, 2009

(30) Foreign Application Priority Data

Aug. 16, 2007 (TW) ................................ 96130331 A

(51) Int. Cl.
  *G08B 21/00* (2006.01)
(52) U.S. Cl. ...................... 340/539.11; 340/5.1; 340/5.2; 340/5.6; 340/5.8; 235/375; 235/381
(58) Field of Classification Search ............. 340/539.11, 340/539.1, 531, 500, 5.6, 5.2, 5.1, 825, 5.8; 235/375, 381
  See application file for complete search history.

(56) References Cited

U.S. PATENT DOCUMENTS

| 6,400,816 | B1 * | 6/2002 | Hjalmtysson et al. ... 379/201.03 |
| 7,536,550 | B2 * | 5/2009 | Maki .............................. 713/168 |
| 7,543,742 | B2 * | 6/2009 | Takeuchi ....................... 235/380 |
| 2004/0127277 | A1 * | 7/2004 | Walker et al. .................... 463/16 |
| 2006/0016876 | A1 | 1/2006 | Bonalle et al. |
| 2006/0043164 | A1 * | 3/2006 | Dowling et al. .............. 235/375 |
| 2006/0135155 | A1 | 6/2006 | Chung et al. |
| 2006/0278702 | A1 * | 12/2006 | Sakai ............................. 235/382 |
| 2007/0147318 | A1 * | 6/2007 | Ross et al. ..................... 370/338 |

FOREIGN PATENT DOCUMENTS

| CN | 1599338 | 3/2005 |
| JP | 2007065715 | 3/2007 |
| TW | 566030 | 12/2003 |
| TW | I234978 | 6/2005 |

OTHER PUBLICATIONS

"Office Action of Taiwan Counterpart Application", issued on Mar. 9, 2011, p. 1-p. 6.
"First Office Action of China Counterpart Application", issued on Nov. 1, 2010, p. 1-p. 8.

* cited by examiner

*Primary Examiner* — Jennifer Mehmood
*Assistant Examiner* — Mark Rushing
(74) *Attorney, Agent, or Firm* — Jianq Chyun IP Office

(57) ABSTRACT

An authentication system for a wireless network is disclosed. The authentication system includes a card, a card reader, an end-user device, and a wireless access device. The card reader is coupled to the wireless access device. The card records a data, and the card reader reads the data recorded in the card. The wireless access device receives the data read by the card reader and performs authentication between the wireless access device and the end-user device according to the data.

22 Claims, 8 Drawing Sheets

AUTHENTICATION SYSTEM AND METHOD THEREOF FOR WIRELESS NETWORKS

CROSS-REFERENCE TO RELATED APPLICATION

This application claims the priority benefit of Taiwan application serial no. 96130331, filed on Aug. 16, 2007. All disclosure of the Taiwan application is incorporated herein by reference.

BACKGROUND OF THE INVENTION

1. Field of the Invention

The present invention generally relates to an authentication system and a method thereof for a wireless network, in particular, to an authentication system using a card technique and a method thereof for a wireless network.

2. Description of Related Art

In recent years, the conventional cable networks have been gradually replaced by wireless networks so that users can access the Internet or communicate with each other from anywhere covered by a wireless network. Along with the drastic decrease in the cost of wireless network devices, many families, offices, and conference centres have adopt wireless networking as the optimal solution of Internet connection.

However, since wireless networking still belongs to radio wave propagation technique, the communication data within an area covered by a wireless network may be eavesdropped or attached, and accordingly the security, integrity, and eligibility of the communication data may be threatened. The threats caused by the connatural characteristics of a wireless network include eavesdropping, masquerade, replay, message modification, session hijacking, denial-of-services, man-in-the-middle etc.

To protect a wireless network from attack, different security mechanisms are adopted by wireless network devices. In particular, authentication mechanism is the most essential security mechanism for wireless network access, and the design and implementation of an authentication mechanism have to be complete and comprehensive. However, the more comprehensive an authentication mechanism (for example, 802.1X of WiFi and PKMv2 of WiMAX) is, the more complicated the operation thereof is. Thus, a user of the authentication system has to be very careful with all the related configurations, and the work load of the authentication system is very heavy. Moreover, foregoing problems increase the load of both the authentication system and the user while the user accesses the wireless network.

Most existing authentication mechanisms are directly related to the standard specifications of wireless network infrastructures (for example, WiFi, WiMAX, Bluetooth, or 3G etc), the user networking devices and corresponding authentication methods (for example, EAP-SIM for GSM mobile phones, EAP-AKA for 3G mobile phones, EAP-TLS for notebook computers with digital certificates etc), and wireless device specifications regarding operation environments (specification of home WiFi AP, network device specification in an organization, network device specification at a public place). By far, there is not a single method for performing network-independent, device-independent, and environment-independent authentication.

Accordingly, the present invention provides a network-independent, device-independent, and environment-independent authentication system and a method thereof.

SUMMARY OF THE INVENTION

Accordingly, the present invention is directed to an authentication system for a wireless network, wherein the authentication system is network-independent, device-independent, and environment-independent.

The present invention is directed to an authentication method for a wireless network, wherein the authentication method is network-independent, device-independent, and environment-independent.

The present invention provides an authentication system for a wireless network. The authentication system includes a card, a card reader, an end-user device, and a wireless access device. The card reader is coupled to the wireless access device. The card records a data, and the card reader reads the data recorded in the card. The wireless access device receives the data read by the card reader and performs authentication between the end-user device and the wireless access device according to the data.

The present invention provides an authentication method for a wireless network. The authentication method includes following steps. First, a card and a card reader are provided, and a data recorded in the card is read by the card reader. Next, the data recorded in the card is transmitted to a wireless access device. After that, authentication between the wireless access device and an end-user device is performed according to the data recorded in the card.

The authentication system and method thereof provided by the present invention are based on a card technique, wherein a card and a card reader are served as a bridge for the authentication. Thereby, the authentication system in the present invention is very convenient in the operation thereof, and besides, the security issue in wireless data transmission is avoided. Furthermore, various end-user devices can be used, and accordingly authentication in different wireless networks can be achieved by using the authentication system and method thereof in the present invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
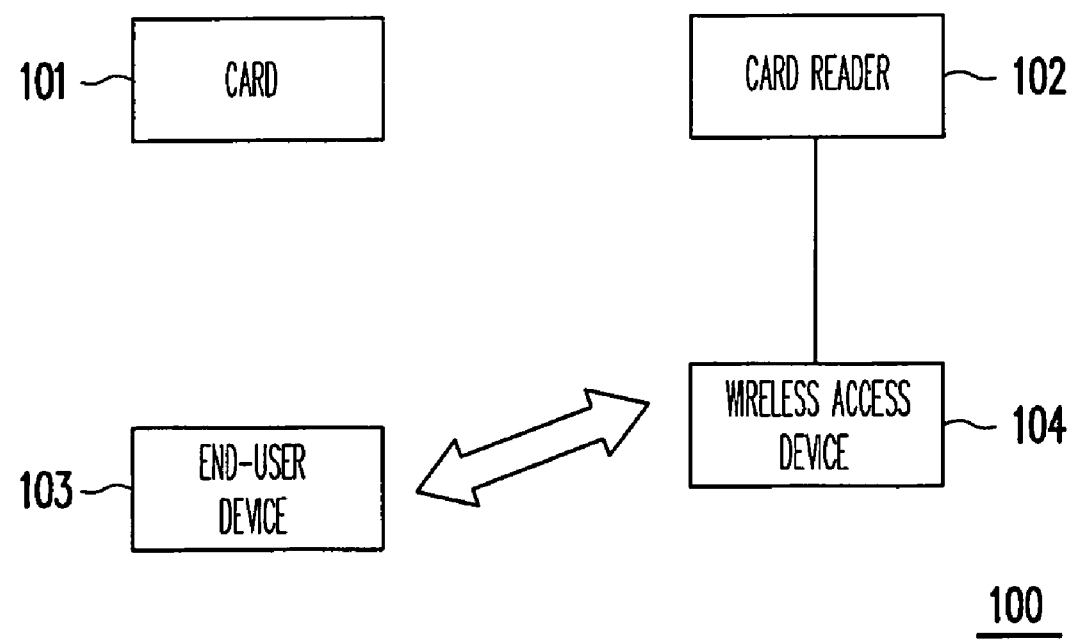
FIG. 1A illustrates an authentication system for a wireless network according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1A illustrates an authentication system for a wireless network according to an embodiment of the present invention. Referring to FIG. 1A, the authentication system 100 includes a card 101, a card reader 102, an end-user device 103, and a wireless access device 104. The card reader 102 is coupled to the wireless access device 104. The card 101 records a data, and the card reader 102 reads the data recorded in the card 101. The wireless access device 104 receives the data read by the card reader 102 and performs authentication between the end-user device 103 and the wireless access device 104 according to the data.

Figure 2:
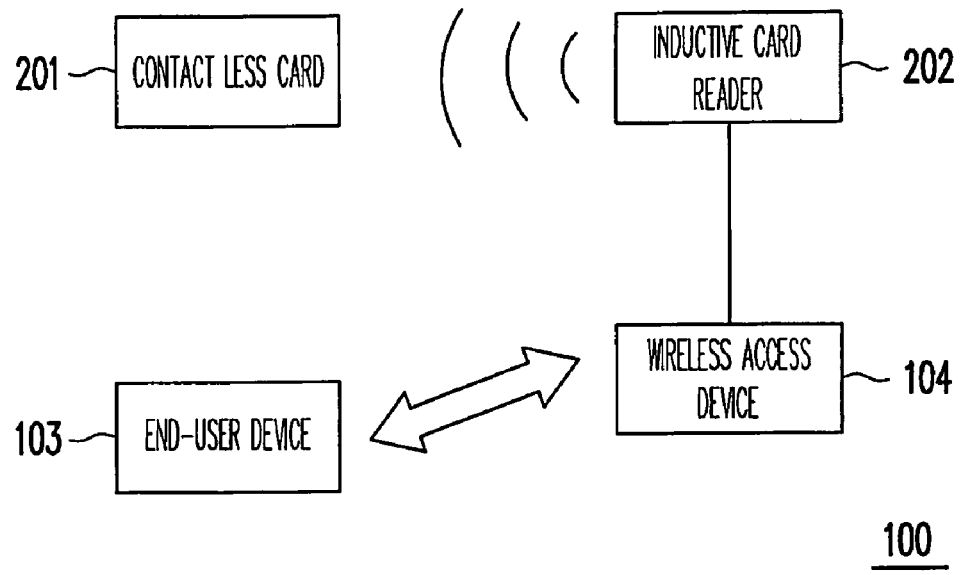
FIG. 2 illustrates an implementation of a card 101 and a card reader 102.
Figure 3:
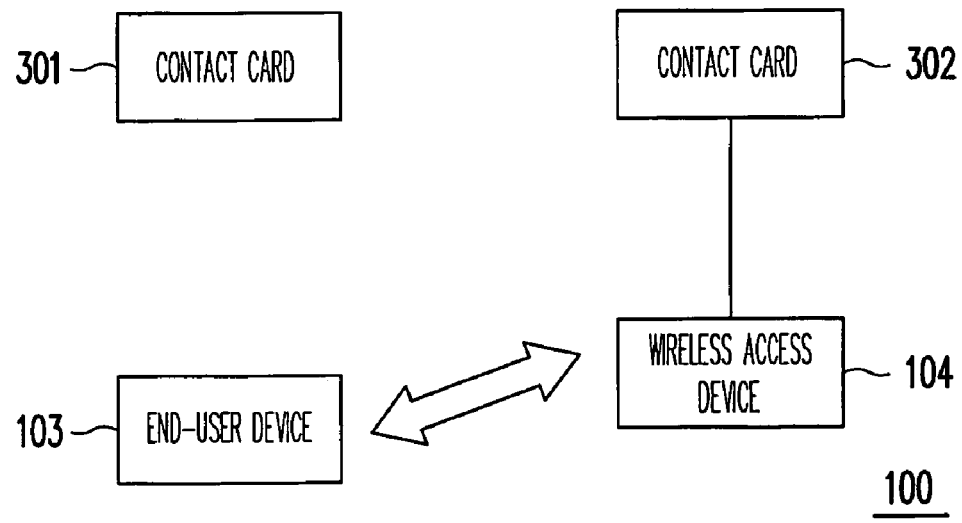
FIG. 3 illustrates another implementation of the card 101 and the card reader 102.

Refer to FIG. 2 and FIG. 3, wherein FIG. 2 illustrates an implementation of the card 101 and the card reader 102, and FIG. 3 illustrates another implementation of the card 101 and the card reader 102. As shown in FIG. 2, the card 101 may be a contact less card 201, and the card reader 102 may be an inductive card reader 202, wherein the inductive card reader 202 reads the data recorded in the contact less card 201 through the inductive circuit thereof. As shown in FIG. 3, the card 101 may be a contact card 301, and the card reader 102 may be a contact card reader 302, wherein the contact card 301 is inserted into or slid through the contact card reader 302 so that the contact card reader 302 can read the data recorded in the contact card 301.

Figure 4:
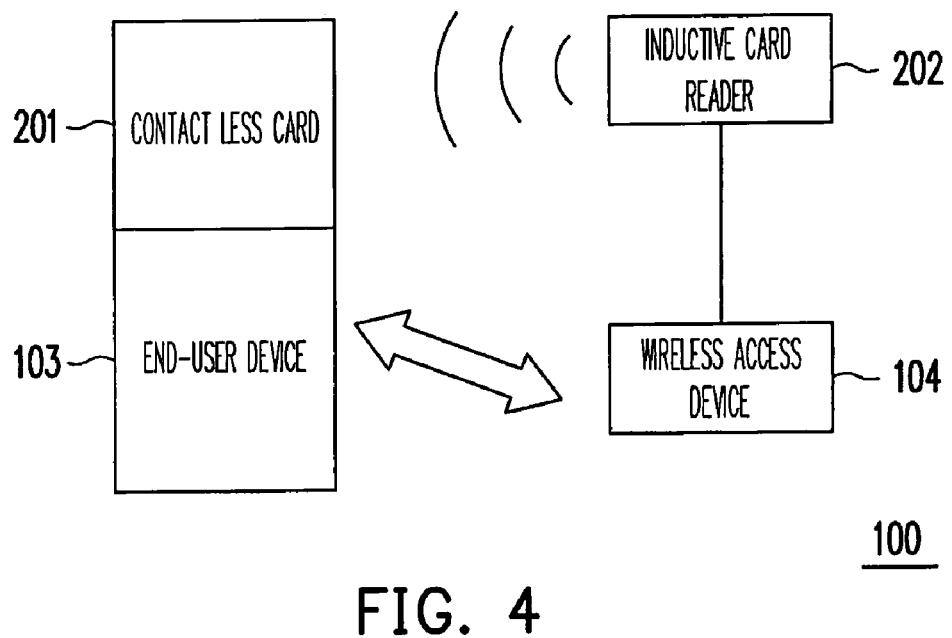
FIG. 4 illustrates yet another implementation of the card 101 and the card reader 102.

Next, refer to FIG. 4, wherein FIG. 4 illustrates yet another implementation of the card 101 and the card reader 102. As shown in FIG. 4, the card 101 may be a contact less card 201, and the card reader 102 may be an inductive card reader 202, wherein the contact less card 201 is embedded in the end-user device 103. The operation of the card 101 and the card reader 102 is as described above therefore will not be described herein.

The implementations of the card 101 and the card reader 102 described above are only used for describing the present invention but not for restricting the scope thereof, and it should be understood by those having ordinary knowledge in the art that various changes in form and details may be made therein without departing from the spirit and scope of the present invention.

The wireless access device 104 includes at least one wireless access apparatus, namely, the wireless access device 104 may be a group of or a single wireless access apparatus. The wireless access apparatus may be applied to a GSM, GPRS, WiFi, WiMAX, 3G, or 4G system. In addition, the end-user device 103 may be an Internet accessing device such as a notebook computer, a PDA, a flat panel computer, a dual-mode cell phone, or a 3G cell phone. The wireless access device 104 and the end-user device 103 are only implementations of the present invention but not for restricting the present invention, and it should be understood by those having ordinary knowledge in the art that various changes in form and details may be made therein without departing from the spirit and scope of the present invention. In other words, it is within the scope of the present invention as long as a connection is established or an authentication is performed through a card system between two devices. For example, the wireless access device 104 may be a video push-casting system, and the end-user device 103 may be a device having an audio output interface, wherein the audio data of the video push-casting system can be presented by the end-user device 103 through the authentication system and the method thereof. Additionally, the wireless access device 104 may be an exhibition system data source device, and the end-user device 103 may be a device having a display interface or an audio output interface, wherein the data of the exhibition system can be presented by the end-user device 103 through the authentication system and the method thereof. Any similar implementation is also within the scope of the present invention.

Figure 1B:
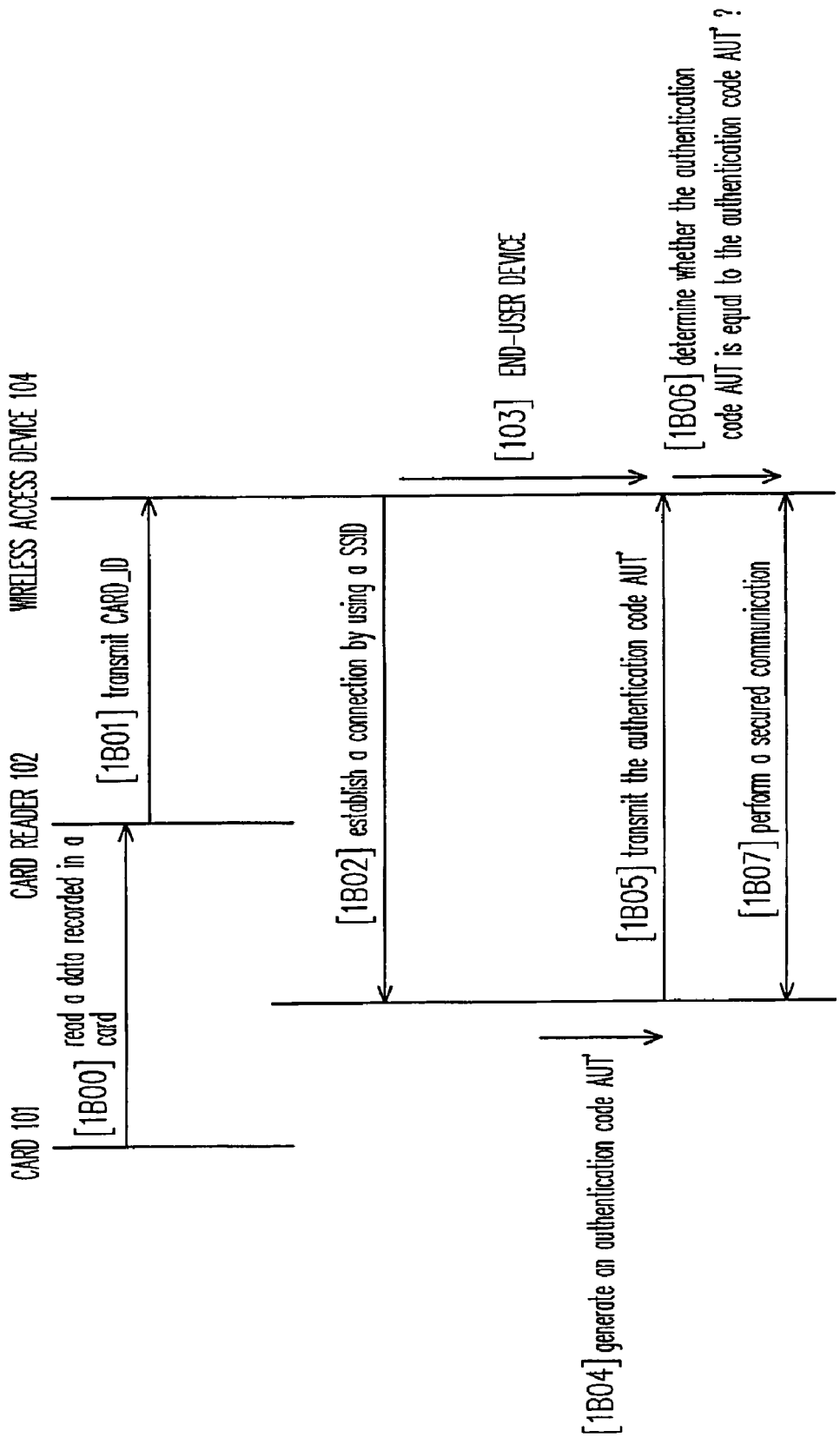
FIG. 1B illustrates an implementation of the authentication protocol used in the authentication system illustrated in FIG. 1A.

Referring to FIG. 1A, the authentication between the end-user device 103 and the wireless access device 104 can use different authentication mechanisms according to different situations. A simple authentication mechanism will be taken and described as an example with reference to FIG. 1B; however, this is only for the convenience of description but not for restricting the present invention. FIG. 1B illustrates an implementation of an authentication protocol adopted by the authentication system illustrated in FIG. 1A. Referring to both FIG. 1A and FIG. 1B, the end-user device 103 has the data recorded in the card 101, for example, a card identification code CARD_ID'. First, the card reader 102 reads the card identification code CARD_ID recorded in the card 101 (step 1B00). Next, the card reader 102 sends the card identification code CARD_ID to the wireless access device 104 (step 1B01). Then, the end-user device 103 establishes a connection with the wireless access device 104 through a fixed service set identifier (SSID) (step 1B02). The wireless access device 104 inputs the received card identification code CARD_ID into a hash function H0 to generate an authentication code AUT (step 1B03). After that, the end-user device 103 inputs the card identification code CARD_ID' into the hash function H0 to generate an authentication code AUT' (step 1B04). Next, the end-user device 103 sends the authentication code AUT' to the wireless access device 104 (step 1B05). Finally, the wireless access device 104 compares the self-generated authentication code AUT and the received authentication code AUT' (step 1B06). If the two authentication codes do not match each other, the authentication system 100 terminates or restarts the network connection; otherwise, if the two authentication codes match each other, the end-user device 103 and the wireless access device 104 calculate a common encryption key in order to perform a secured communication (step 1B07).

The authentication between the end-user device 103 and the wireless access device 104 described above is only an implementation of the present invention but not for restricting the present invention. Additionally, the user may also input a user ID and a password corresponding to the data recorded in the card 101 so that the end-user device 103 and the wireless access device 104 can perform authentication according to the user ID and password and the data recorded in the card 101. Various authentication protocols and techniques can be adopted for the authentication between the end-user device 103 and the wireless access device 104. In short, forgoing authentication mechanism has different implementations and is not for restricting the present invention.

Figure 5A:
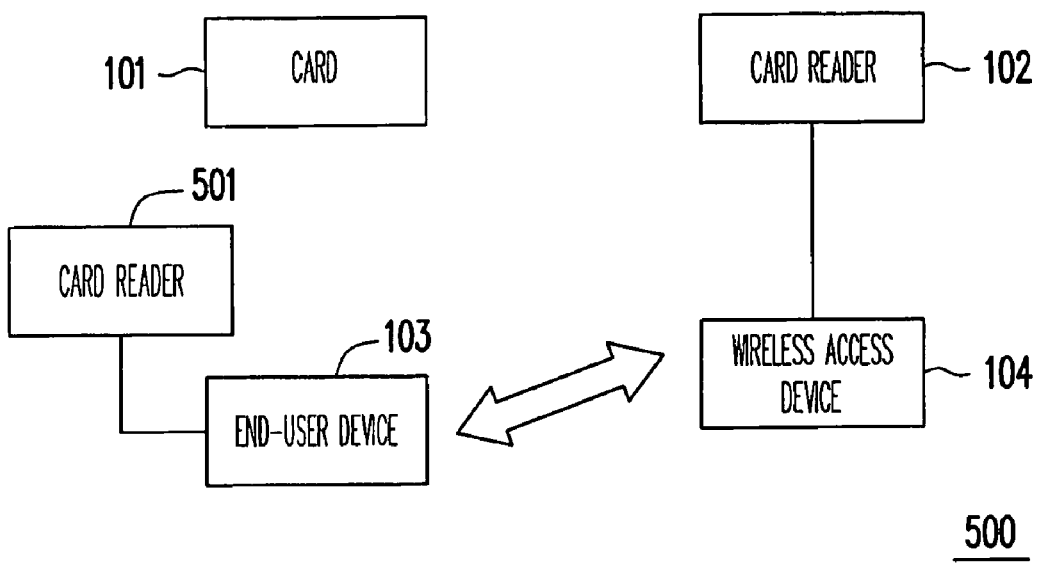
FIG. 5A illustrates an authentication system for a wireless network according to an embodiment of the present invention.

FIG. 5A illustrates an authentication system for a wireless network according to an embodiment of the present invention. The only difference between FIG. 5A and FIG. 1A is that the authentication system 500 in FIG. 5A further includes a card reader 501 coupled to the end-user device 103. The card reader 501 reads the data recorded in the card 101 and sends the data to the end-user device 103.

Figure 6:
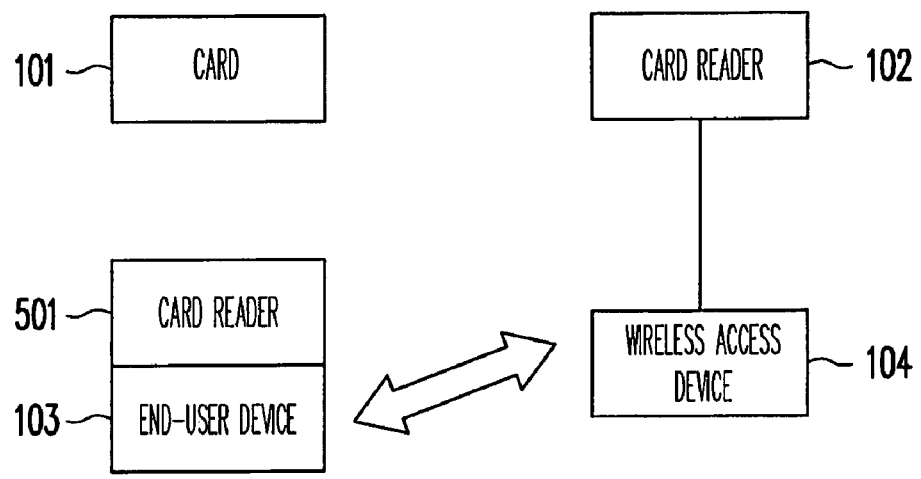
FIG. 6 illustrates an authentication system for a wireless network according to an embodiment of the present invention.

The card 101, card reader 102, and card reader 501 in FIG. 5A can be implemented as described above. The card 101 may be a contact less card, the card reader 102 may be an inductive card reader, and the card reader 501 may be an inductive card reader. In other embodiments of the present invention, the card 101 may also be a contact card, the card reader 102 may be a contact card reader, and the card reader 501 may be a contact card reader. In addition, the card reader 501 can be embedded in the end-user device 103, as shown in FIG. 6.

The authentication between the end-user device 103 and the wireless access device 104 in FIG. 5A may also be implemented differently as described above. In FIG. 1B the network connection is established through a fixed SSID, namely, a static SSID. However, a dynamic SSID D_SSID will be adopted in following embodiment in order to avoid disturbance from other counterfeit wireless access devices (i.e., the power transmitted by a counterfeit wireless access device is greater than the power transmitted by the legitimate wireless access device 104) or data eavesdropping and to improve the security of the entire authentication system.

Figure 5B:
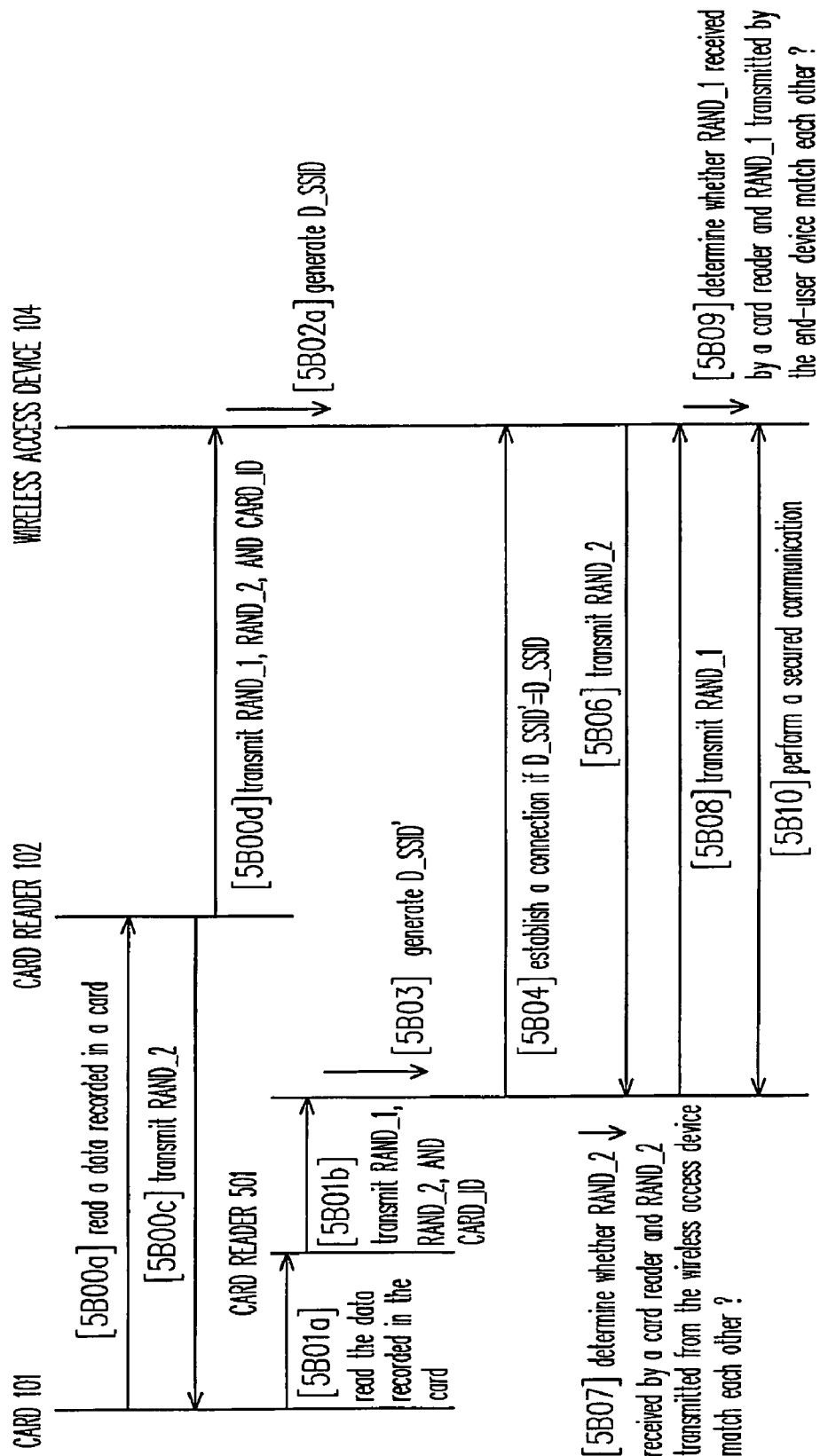
FIG. 5B illustrates an implementation of the authentication protocol used in the authentication system illustrated in FIG. 5A.

See FIG. 5B, FIG. 5B illustrates an implementation of the authentication protocol used in the authentication system illustrated in FIG. 5A. In FIG. 5B, the authentication protocol is implemented with a dynamic SSID; however, which is not for restricting the present invention. Referring to FIG. 5A and FIG. 5B, first, the card reader 102 reads the data recorded in the card 101, for example, a card identification code CARD_ID and a random number RAND_1 (step 5B00$a$). The card reader 102 generates a random number RAND_2 and writes the random number RAND_2 into the card 101 (step 5B00$c$). The card reader 102 sends the random number RAND_2, the random number RAND_1, and the card identification code CARD_ID to the wireless access device 104 (step 5B00$d$). Next, the wireless access device 104 inputs the card identification code CARD_ID and the random number RAND_2 into a hash function H1 to generate the dynamic SSID D_SSID (step 5B02$a$).

After that, the card reader 501 reads the card identification code CARD_ID, the random number RAND_1, and the random number RAND_2 recorded in the card 101 (step 5B01$a$). The card reader 501 sends the card identification code CARD_ID, the random number RAND_1, and the random number RAND_2 to the end-user device 103 (step 5B01$b$). Next, the end-user device 103 inputs the received the random number RAND_2 and card identification code CARD_ID into the hash function H1 to generate a dynamic SSID D_SSID' (step 5B03). If the dynamic SSID D_SSID' generated by the end-user device 103 and the dynamic SSID D_SSID generated by the wireless access device 104 match each other, the connection between the end-user device 103 and the wireless access device 104 is established (step 5B04).

Thereafter, the wireless access device 104 sends the received card identification code CARD_ID and random number RAND_2 to the end-user device 103 for authentication through the connection established in step 5B04 (step 5B06). Then the end-user device 103 compares the random number RAND_2 received from the card reader 501 and the random number RAND_2 received from the wireless access device 104 (step 5B07). If the two do not match each other, the authentication system 500 terminates or restarts the network connection; otherwise, the end-user device 103 sends the random number RAND_1 to the wireless access device 104 for authentication via the wireless network (step 5B08). Finally, the wireless access device 104 compares the random number RAND_1 received from the end-user device 103 and the random number RAND_1 received from the card reader 102 (step 5B09). If the two do not match each other, the authentication system 500 terminates or restarts the network connection; otherwise, the end-user device 103 and the wireless access device 104 calculate a common encryption key for performing secured communication (step 5B10). The adoption of the dynamic SSID is only a characteristic of embodiments provided by the present invention but not for restricting the present invention, and it is within the scope of the present invention as long as a dynamic SSID is generated or adopted.

Figure 7A:
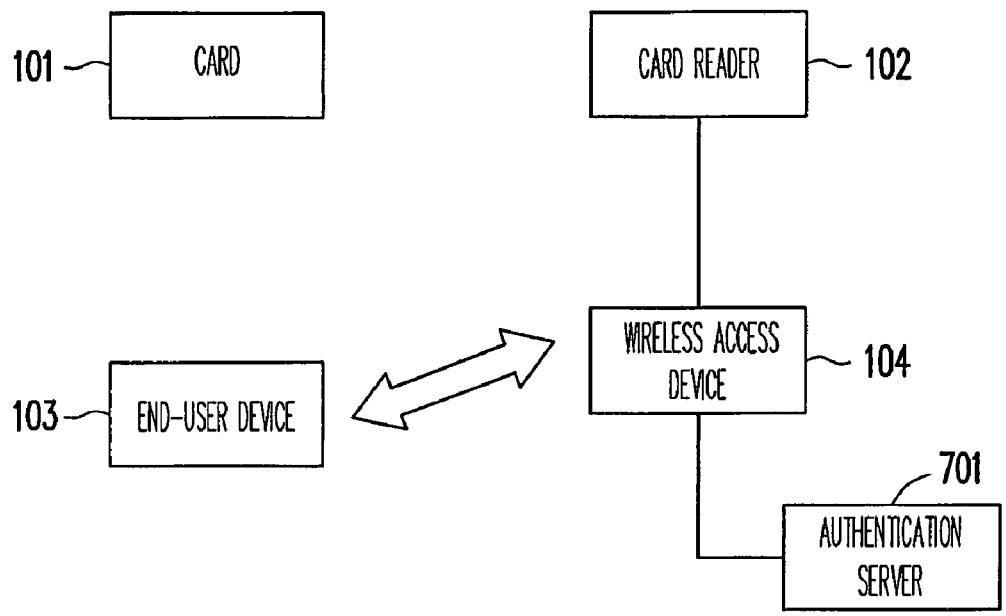
FIG. 7A illustrates an authentication system for a wireless network according to an embodiment of the present invention.

FIG. 7A illustrates an authentication system for a wireless network according to an embodiment of the present invention. Referring to FIG. 7A, the difference thereof from FIG. 1A is that the authentication system 700 in FIG. 7A is further disposed with an authentication server 701 coupled to the wireless access device 104. The wireless access device 701 queries a corresponding user authentication data from the authentication server 701 according to the data recorded in the card 101 and compares the user authentication data with a data input by the end-user device 103 via the wireless network so as to accomplish the authentication between the end-user device 103 and the wireless access device 104.

Figure 7B:
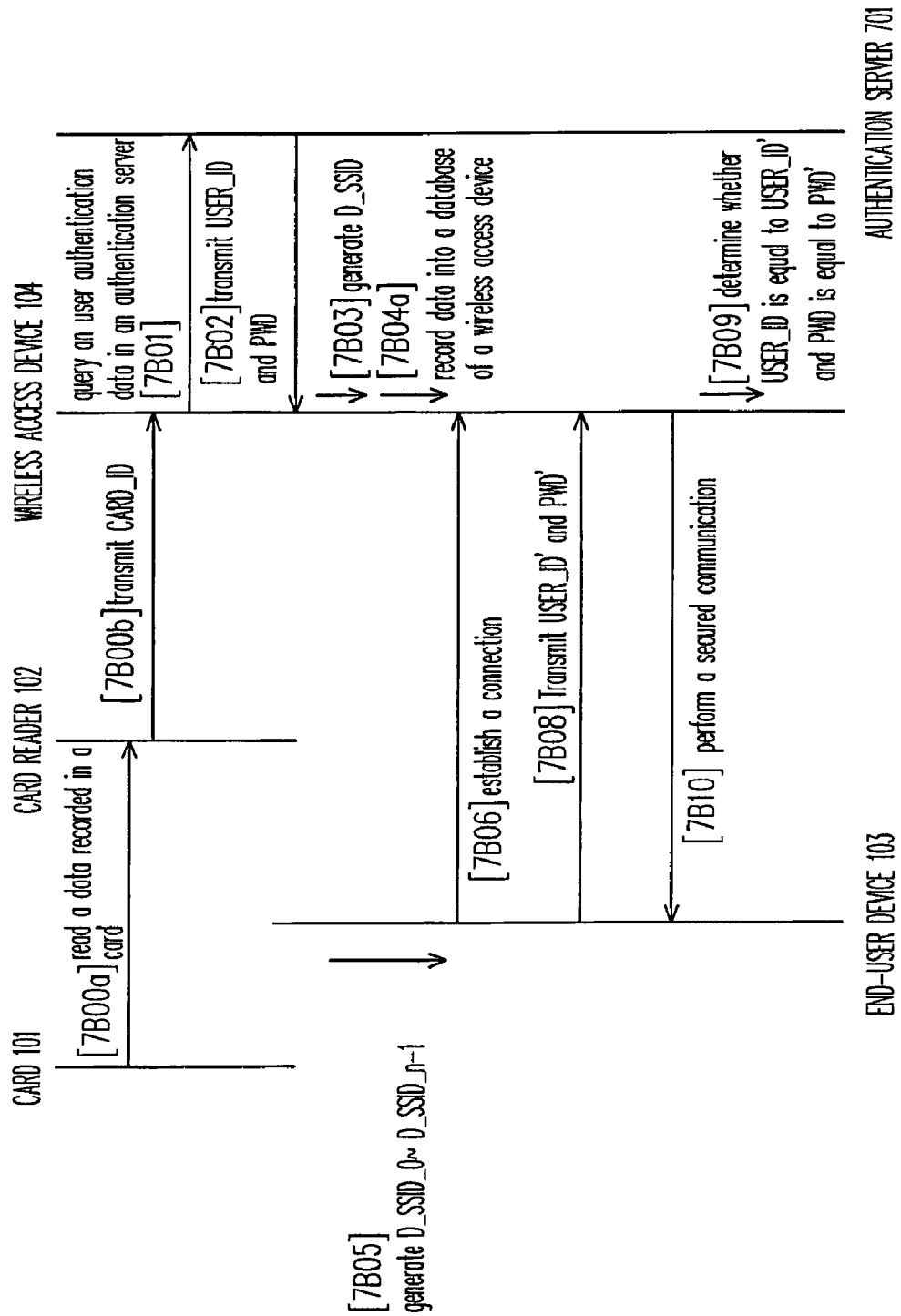
FIG. 7B illustrates an implementation of the authentication protocol used in the authentication system illustrated in FIG. 7A

The authentication mechanisms between the end-user device 103 and the wireless access device 104 in FIG. 7A may also be implemented differently. FIG. 7B illustrates an implementation of the authentication protocol used in the authentication system illustrated in FIG. 7A. Referring to FIG. 7B, even though a dynamic SSID is adopted for implementing the authentication protocol, it is not for restricting the present invention. First, the card reader 102 reads the data recorded in the card 101, for example, a card identification code CARD_ID (step 7B00$a$). The card reader 102 sends the card identification code CARD_ID to the wireless access device 104 (step 7B00$b$). Next, the wireless access device 701 queries a corresponding user authentication data, for example, a user identification code USER_ID and a password PWD, from the authentication server 701 according to the card identification code CARD_ID (step 7B01). After that, the authentication server 701 sends the corresponding user identification code USER_ID and password PWD to the wireless access device 104 according to the card identification code CARD_ID (step 7B02).

Thereafter, the wireless access device 104 inputs the user identification code USER_ID and a random number RAND_1 into a hash function H2 to generate a dynamic SSID D_SSID (step 7B03), wherein the random number RAND_1 is between 0 and n−1. Next, the wireless access device 104 records the dynamic SSID D_SSID, the card identification code CARD_ID, the user identification code USER_ID, and the password PWD in a database of the wireless access device 104 to be used in subsequent authentication operation (step 7B04$a$). Meanwhile, the wireless access device 104 also establishes an access service channel by using the dynamic SSID D_SSID.

After that, the end-user device 103 receives a user identification code USER_ID' and a password PWD' input by a user and sends the user identification code USER_ID' and numbers 0~n−1 respectively into a hash function H2 to generate n dynamic SSIDs D_SSID_0, D_SSID_1, . . . , D_SSID_n−1 (step 7B05), and the end-user device 103 then compares the n dynamic SSIDs D_SSID_0~D_SSID_n−1 with the dynamic SSID D_SSID. If none of the n dynamic SSIDs D_SSID_0~D_SSID_n−1 matches the dynamic SSID D_SSID, the network connection cannot be started. If one of the n dynamic SSIDs D_SSID_0~D_SSID_n−1 (for example, D_SSID_0) matches the dynamic SSID D_SSID, the end-user device 103 establishes a connection to the wireless access device 104 by using the access service channel D_SSID (step 7B06).

Next, the end-user device 103 sends the user identification code USER_ID' and the password PWD' to the wireless access device 104 (step 7B08). After that, the wireless access device 104 respectively compares the user identification codes (USER_ID=USER_ID'?) and the passwords (PWD=PWD'?) (step 7B09). If the user identification codes or the passwords do not match each other, the authentication system 700 terminates the network connection; otherwise, the end-user device 103 and the wireless access device 104 calculate a common encryption key for performing secured communication (step 7B10).

Figure 8:
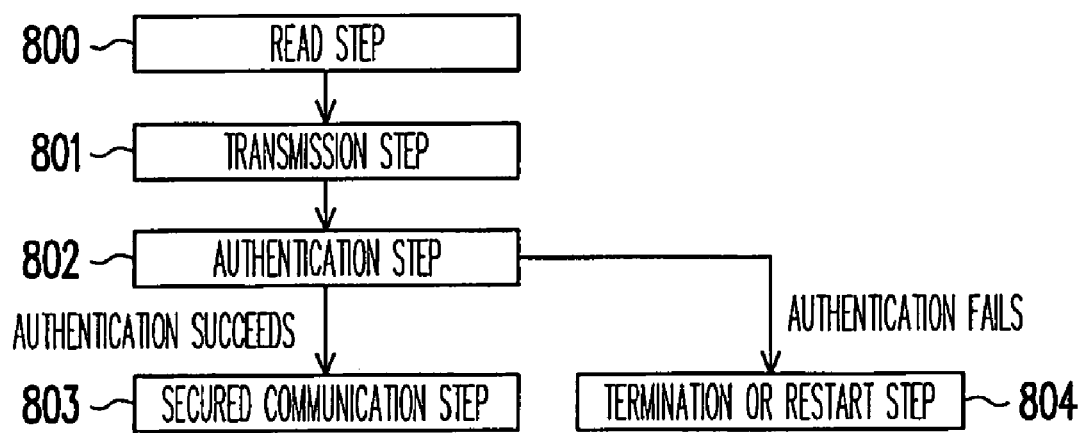
FIG. 8 is a flowchart of an authentication method for a wireless network according to an embodiment of the present invention.

FIG. 8 is a flowchart of an authentication method for a wireless network according to an embodiment of the present invention. The method is adaptable to the authentication between a wireless access device and an end-user device and includes following steps. First, a card and a first card reader are provided, and a first data recorded in the card is read by the first card reader (read step 800). The first data recorded in the card is sent to the wireless access device (transmission step 801). An authentication between the wireless access device and the end-user device is performed according to the first data (authentication step 802). The method further includes following steps. If the authentication between the wireless access device and the end-user device succeeds, the wireless access device and the end-user device calculate a common encryption key for performing secured communication (secured communication step 803). If the authentication between the wireless access device and the end-user device fails, the network connection is terminated or restarted (termination or restart step 804). In addition, according to embodiments described above, the transmission step 801 further includes providing another card reader for reading the first data recorded in the card and transmitting the first data to the end-user device.

The authentication step 802 may also be implemented differently as described in foregoing embodiments. First example, the end-user device sends the first data recorded in the card to the wireless access device via the wireless network, so as to accomplish the authentication between the end-user device and the wireless access device. Besides, the authentication step 802 may also be implemented as following: (a) after the first card reader reads the first data, the first card reader generates a second data and writes the second data into the card, and the first card reader further sends the second data and the first data to the wireless access device; (b) the second card reader reads the first data and the second data recorded in the card and sends the first data and the second data to the end-user device; (c) the end-user device sends the first data and the second data to the wireless access device via the wireless network for authentication. The second data is a random number. However, as described in foregoing embodiments, the authentication step 802 may also be implemented as following steps. First, the wireless access device queries a corresponding user authentication data from an authentication server according to the first data recorded in the card, and then the wireless access device compares the user authentication data and a data input by the end-user device so as to accomplish the authentication between the end-user device and the wireless access device.

An application of the present invention will be described herein. A contact less card reader integrated with a wireless access device (for example, a WiMAX MS) is disposed in a bus. When a passenger gets on the bus, the passenger sweeps a contact less card (for example, an EasyCard) over the card reader to exchange data. The card reader sends the received data to the wireless access device so that the wireless access device can query a user data in an external authentication server (for example, the EasyCard system). After that, the user data required for user authentication (for example, an identification code and a password) is sent back to the wireless access device. When the passenger turns on an end-user device (for example, a notebook computer) to access the Internet, the wireless access device requires the passenger to enters a data from an interface of the end-user device required for authentication (for example, an identification code and a password). Once the passenger enters the data, the input data is sent to the wireless access device for user authentication. The network connection is established if the authentication succeeds. The passenger can terminates or restarts the network connection anytime. When the passenger gets off the bus and the bus fare is deducted from the contact less card through the card reader, the network service fee is also deducted and the related data of the contact less card recorded in the wireless access device is deleted.

Next, another application of the present invention will be described. A contact less card reader integrated with a wireless access device (for example, a WiMAX MS) is disposed in a taxi. When a passenger gets on the taxi, the passenger sweeps a contact less card (for example, an EasyCard) over the card reader to exchange data, the card reader sends the received data to the wireless access device. When the passenger turns on an end-user device (for example, a notebook computer) to access the Internet, an external contact less card reader (for example, a USB Card Reader) provided by the taxi driver or the passenger is connected to the end-user device, and the same contact less card is swept over the external contact less card reader to establish a data connection between the contact less card and the end-user device, so that the wireless access device can perform an authentication and establish a network connection accordingly (referring to foregoing embodiment for the detailed procedure). The passenger can terminates or restarts the network connection any time. When the passenger gets off the taxi and the taxi fare is deducted from the contact less card through the card reader, the network service fee is also deducted and the related data of the card recorded in the wireless access device is deleted.

Yet another application of the present invention will be described below. Assuming a visitor visits a company, after the visitor has registered in a visitor service center, the visitor service center issues a contact less card to the visitor. The contact less card is actually an access control card which records the accessible buildings or conference rooms, and the access control devices of various areas (contact less card readers) have been connected to the corresponding wireless access devices. When the visitor sweeps his contact less card over an access control system in order to enter a particular conference room, the related data of the card is also recorded in the wireless access device of the conference room. When the visitor turns on an end-user device (for example, a notebook computer) to access the Internet, an external contact less card reader (for example, a USB Card Reader) is connected to the end-user device and the same contact less card is swept over the external contact less card reader to establish a data connection between the contact less card and the end-user device, so that the wireless access device can perform an authentication and establish a network connection accordingly (referring to foregoing embodiment for the detailed procedure). The visitor can terminate or restart the network connection anytime, and the visitor returns the contact less card when he leaves the company.

Another application of the present invention will be further described herein. Assuming an engineer is going to a meeting room to attend a meeting, the engineer has an end-user device (for example, a notebook computer) embedded with a contact less inductive circuit (i.e. embedded with a contact less card). When the end-user device of the engineer and the contact less card reader sense each other, the data required for authentication and establishing network connection provided by the contact less card and the end-user device is sent to the wireless access device by the contact less card reader, so that the wireless access device can authenticate the end-user device after it receives the data read by the contact less card reader.

Additionally, most existing video push-casting systems, regardless of indoor TVs or outdoor large screens, are disposed in public places for video push casting therefore the audio functions thereof are mostly turned off. However, the information provided is not complete without playing the audio thereof. The authentication system for wireless network and the method thereof provided by the present invention can be integrated with a video push-casting system, and a host at a video push-casting station can be connected to a card reader, so that a user watching the video can use a cell phone or personal digital assistant (PDA) embedded with a contact less card to establish a connection between the hand-held device and the push-casting host. After that, the push-casting host sends the audio to the end-user device so that the audio and the video can be played together. However, the user can also establish a connection between a notebook computer thereof and the push-casting host by attaching a card reader to the notebook computer and by using a card, so that the audio can be output from an audio output device of the notebook computer. As described above, assuming a visitor visits a company, the visitor service center issues a contact less card to the visitor after the visitor has registered himself. The visitor sweeps the contact less card over a card reader connected to a push-casting host. Next, the visitor connects an external contact less card reader (for example, a USB Card Reader) to an end-user device (for example, the notebook computer) thereof and then sweeps the same contact less card over the external contact less card reader so as to establish a connection between the end-user device and the push-casting host. After that, audio data can be output through an audio output device of the notebook computer together with the video data.

The authentication system and the method thereof provided by the present invention can be further applied to information exhibition. For example, in a quiet museum or exhibition hall, an information exhibition host integrated with a card reader is disposed at each exhibition point. The audio description of an exhibition point can be sent to a headphone embedded with a card through implementation of the present invention, so that the visitor can listen to the description of the exhibition point from the headphone. Or, through the implementation of the present invention, the user can use an end-user device having a screen to receive the video information of the exhibition point, wherein the end-user device is embedded with a card or an external card reader is used. Or, the information of the exhibition point can be downloaded to an end-user device of the visitor through the implementation of the present invention.

In overview, the authentication system for a wireless network and the method thereof provided by the present invention have at least following advantages:

(a) The efficiency in authentication execution is increased. Through the connection between the contact less card reader and the wireless access device, and through the short-distance data exchange of contact less induction technique, the con-natural problems of eavesdropping, masquerade, message modification etc in conventional wireless network authentication can be avoided. Accordingly, the authentication system and the method thereof in the present invention can greatly simplify the wireless network authentication procedure by maintaining a satisfactory security level, thus, the operation power is reduced and the execution efficiency is greatly increased.

(b) The authentication system and the method thereof provided by the present invention are independent to the network structure and the type of the end-user device. Namely, the present invention is adaptable to any wireless network technique, and since the authentication is based on the contact less card, the present invention is adaptable to any end-user device.

(c) A whole new business model can be developed based on the present invention. In the present invention, open wireless network authentication, close wireless network authentication, or card direct authentication can be adopted according to different application environment, such as family, office, or other environment of new business model.

(d) The present invention can work with an existing contact less card application, such as an access control system, a payment system, etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An authentication system for a wireless network, comprising:
  a card, recording a first data;
  a first card reader, reading the first data recorded in the card;
  an end-user device, requiring a wireless access service via a wireless network;
  a wireless access device, coupled to the first card reader via a non-wireless network, for receiving the first data read by the first card reader, performing authentication between the end-user device and the wireless access device via the wireless network, and providing the wireless access service to the end-user device according to the authentication; and
  a second card reader, coupled to the end-user device, for reading the first data recorded in the card and transmitting the first data to the end-user device, wherein after the first card reader reads the first data, the first card reader generates a second data and writes the second data into the card, and the first card reader further transmits the second data and the first data to the wireless access device; the second card reader reads the first data and the second recorded in the card and transmits the first data and the second data to the end-user device; the wireless access device transmits the second data to the end-user device for authentication via the wireless network; and the end-user device transmits the first data to the wireless access device for authentication via the wireless network.

2. The authentication system according to claim 1, wherein the wireless access device and the end-user device are connected to each other through a fixed service set identifier (SSID).

3. The authentication system according to claim 1, wherein the wireless access device and the end-user device are connected to each other through a dynamically produced SSID.

4. The authentication system according to claim 1, wherein the card is embedded in the end-user device.

5. The authentication system according to claim 1, wherein the card is a contact card, and the first card reader is a contact card reader.

6. The authentication system according to claim 1, wherein the second card reader is embedded in the end-user device.

7. The authentication system according to claim 1, wherein the card is a contact less card, the first card reader is a first inductive card reader, and the second card reader is a second inductive card reader.

8. The authentication system according to claim 1, wherein the card is a contact card, the first card reader is a first contact card reader, and the second card reader is a second contact card reader.

9. The authentication system according to claim 1, wherein the end-user device transmits the first data to the wireless access device via the wireless network in order to perform authentication between the end-user device and the wireless access device.

10. The authentication system according to claim 1, wherein the second data is a random number.

11. The authentication system according to claim 1 further comprising:
    an authentication server, coupled to the wireless access device;
    wherein the wireless access device queries a corresponding user authentication data from the authentication server according to the first data recorded in the card and compares the user authentication data and a data input by the end-user device so as to perform authentication between the end-user device and the wireless access device.

12. The authentication system according to claim 1, wherein the wireless access device comprises at least one WiFi access device.

13. The authentication system according to claim 1, wherein the authentication system may be applied to a GSM, GPRS, WiFi, WiMAX, 3G, or 4G wireless communication system.

14. The authentication system according to claim 1, wherein the authentication system may be applied to a video push-casting system, an exhibition system, an access control system, or a payment system.

15. An authentication method for a wireless network, comprising:
    reading a first data recorded in a card by using a first card reader;
    transmitting the first data to a wireless access device via a non-wireless network;
    reading the first data recorded in the card by using a second card reader;
    transmitting the first data to the end-user device;
    writing a second data into the card by using the first card reader when the first card reader finishes reading the first data;
    transmitting the second data and the first data to the wireless access device by using the first card reader;
    reading the first data and the second data recorded in the card by using the second card reader;
    transmitting the first data and the second data to the end-user device by using the second card reader;
    transmitting the second data to the end-user device for authentication via the wireless network by using the wireless access device;
    transmitting the first data to the wireless access device for authentication via the wireless network by using the end-user device;
    performing authentication between the wireless access device and an end-user device via a wireless network, wherein the end-user device requires the wireless access device for a wireless access service via the wireless network; and
    providing the wireless access service to the end-user device according to the authentication.

16. The authentication method according to claim 15 further comprising:
    calculating a common encryption key for performing a secured communication by using the wireless access device and the end-user device if the authentication between the wireless access device and the end-user device succeeds; and
    terminating the network connection or restarting the network connection if the authentication between the wireless access device and the end-user device fails.

17. The authentication method according to claim 15, wherein the wireless access device and the end-user device are connected to each other through a fixed SSID.

18. The authentication method according to claim 15, wherein the wireless access device and the end-user device are connected to each other through a dynamically produced SSID.

19. The authentication method according to claim 15 further comprising:
    transmitting the first data to the wireless access device via the wireless network by using the end-user device in order to perform authentication between the end-user device and the wireless access device.

20. The authentication method according to claim 15 further comprising:
    providing an authentication server;
    querying a corresponding user authentication data from the authentication server according to the first data recorded in the card by using the wireless access device; and
    comparing the user authentication data and a data input by the end-user device via the wireless network by using the wireless access device, so as to perform authentication between the end-user device and the wireless access device.

21. The authentication method according to claim 15, wherein the authentication method may be applied to a GSM, GPRS, WiFi, WiMAX, 3G, or 4G wireless communication system.

22. The authentication method according to claim 15, wherein the authentication method may be applied to a video push-casting system, an exhibition system, an access control system, or a payment system.

* * * * *